United States Patent [19]

Fux et al.

[11] Patent Number: 4,898,671
[45] Date of Patent: Feb. 6, 1990

[54] FILTERING DEVICE FOR THE SEPARATION OF LIQUIDS AND SOLIDS

[76] Inventors: Kamil Fux, Schiebel, Schmerikon; Ludwig Gresa, Bohlstrasse 6, Uznach, both of Switzerland

[21] Appl. No.: 112,377
[22] Filed: Oct. 13, 1987

Related U.S. Application Data

[62] Division of Ser. No. 448,982, Nov. 24, 1982, Pat. No. 4,702,847.

[30] Foreign Application Priority Data

Mar. 25, 1981 [CH] Switzerland ............... 2005/81

[51] Int. Cl.$^4$ ............... B01D 23/24; B01D 29/38
[52] U.S. Cl. ............... 210/333.01; 210/393; 210/411; 210/413
[58] Field of Search ............... 55/294; 15/302, 306 A; 210/355, 393, 394, 397, 408, 411, 414, 415, 791, 797, 798

[56] References Cited

U.S. PATENT DOCUMENTS

| | | | |
|---|---|---|---|
| 2,066,479 | 1/1937 | MacIsaac | 210/415 X |
| 2,603,354 | 7/1952 | Way et al. | 210/408 X |
| 3,357,566 | 12/1967 | Schmid et al. | 210/411 X |
| 4,266,953 | 5/1981 | Matthys et al. | 55/294 |
| 4,702,847 | 10/1987 | Fux et al. | 210/393 X |

*Primary Examiner*—W. Gary Jones
*Attorney, Agent, or Firm*—Helfgott & Karas

[57] ABSTRACT

A filter apparatus for separating solids from a liquid in a slurry, is cleaned by a jet and a sludge removal device. The filter is generally flat and has an inflow side on which the solids are deposited and an outflow side supported by a grid. The grid subdivides the outflow side into a plurality of separate injection chambers and defines a plurality of separate small regions of the filter material. The jet directs a stream of liquid through one of the injection chambers and against one of the small regions of the filter defined by the injection chamber. A cover plate is provided on the jet for engaging the grid to close one injection chamber opposite the filter material. The sludge removal device is located on the inflow side of the filter and is aligned with the jet to receive solids dislodged from the filter. The jet and sludge removal device more simultaneously and in alignment with each other to close selectively and to direct a stream of liquid through each of the injection chambers.

8 Claims, 4 Drawing Sheets

FILTERING DEVICE FOR THE SEPARATION OF LIQUIDS AND SOLIDS

This is a division of application Ser. No. 448,982, filed Nov. 24, 1982 now U.S. Pat. No. 4,702,847.

In the operation of modern sewage treatment plants, the separation of water and solids takes place almost exclusively in the sedimentation tank.

This type of separation is incomplete, because the solids are very light and are discharged from the sedimentation tank in large quantities by the outflowing water.

The discharge of solids is particularly great if hydraulic shocks occur, or if the biological decomposition is disturbed by a certain toxic action or by a one-sided sewage composition. These known disadvantages of the sedimentation tank are compensated by two countermeasures, namely flocculation or filtration, or the combination of both these measures.

Numerous filtering devices are already known for the filtration of the sedimentation tank. It is common to all these that they are connected downstream of the sedimentation tank.

Swiss Patent 553 558 describes revolving drum filtering devices, which are incorporated directly into a biological plant. This revolving drum filter has a cleaning means constructed on the vacuum cleaner principle, which rests on the filter surface and flushes back the filter materials by suction.

In the case of such filters, mainly felt-like filter materials are used and they clog up due to microorganisms and algae. Due to the strong suction force of the pump, in the case of a clogged filter, the frictional resistance between the suction means and the filter material is so great, that the filter material is torn away from the drum.

This known filtering device has a further serious disadvantage. It is generally known that a vacuum pump never functions with a plurality of parallel-connected suction pipes, water only being sucked through the pipe where the resistance is lowest. The same applies in connection with filter cleaning. The surface of the filter is best cleaned by suction at those points where it is least clogged.

As a result of this, in the known device, the width of the filter belt to be cleaned is limited. In the case of wider suction connections, the function of such filter eleaning processes is dubious.

U.S. Pat. No. 3,575,850 describes a similar drum or revolving filter. Filter cleaning takes place by spraying the filter material surface exposed to the air. The filtered, suspended substances are removed by a gutter.

Such filtering devices are always of a large rotary type, with poor surface utilization with respect to the filter volume. They also have the disadvantage that they must always be installed in a separate tank prepared for the filter. The gradient losses in the feed and discharge pipes and in the filtering device are generally so great that the existing natural gradients are no longer sufficient. It is therefore necessary to instal an additional sewage lifting means.

In addition, a filtering device is known, in which a wide-meshed filter gauze is horizontally installed between the discharge channels. The sewage flows from bottom to top through the filter materials and over a period of time a layer of sludge builds up from the deposition side on the gauze and which acts as a filter layer.

Filter cleaning takes place manually by lowering the water level and spraying the gauze with mains water.

The disadvantage of this filtering device is the manual operation. Only wide-meshed filter materials can be used, so that the cleaning intervals are as long as possible. The fiter must be put out of operation for cleaning purposes.

In the sewage treatment field, numerous sand filters are also known, but they have nothing in common with the presently described filter.

Sewage filtration is relatively new, it being used as a further cleaning stage and in most cases must therefore additionally be fitted in an existing sewage treatment plant.

All the previously mentioned filter types require a separate filter tank and, if the the natural gradient is not sufficient, an additional lifting means is also required.

The problem of the present invention is to provide a simple and inexpensive filtering device, which in an extremely economic manner can be installed in existing sedimentation tanks or can also be installed as a detached filtering device. p For the solution of this problem, the filtering device must only require a limited construction surface and must be able to work with limited gradient losses. In addition, the filtering device must comprise standardized, small-area components, which can be assembled in modular manner in any existing tank for any depth and width.

Thus, the aforementioned filtering device is characterized in that it comprises filter plates accessible from both sides, whose surface is cleaned on either side by means of moving spraying and sludge removal devices.

The novel filtering device leads to numerous decisive advantages not obtained with known filtering devices.

Due to the fact that the water sprayed on to the filter surface cannot escape to the sides, due to the support grid subdivided into smaller zones or due to the specific construction of the cover plate, filter cleaning is effective and the consumption of flushing back water is low.

Due to the fact that in one embodiment the filtering device is constructed as a U-shaped gutter, it can be installed in an existing sedimentation tank. This obviates the cost of a new tank, as well as for sewers and possibly pump stations. It is possible in certain cases to instal the filter cleaning device on the existing sludge removal bridge and thereby obtain further price advantages.

Due to the fact that filter cleaning simultaneously takes place by powerful spraying and limited suction, there can be no great frictional resistance between the filter surface, so that the filter material is largely protected and the life thereof signficantly increased.

Due to the fact that the filter comprises one or more U-shaped gutters, it is possible to install very large filter surfaces on a small construction surface.

Due to the fact that suction is only used for removing the sludge and not for cleaning purposes, wide or several sludge removal means can be installed on a vacuum pump.

As required, the aforementioned filter cleaning device can be installed in three movement directions. Preferably the horizontal movement direction is used if the filtering device of a drain replaces a sedimentation tank.

In this arrangement, the filter plates can be installed in a peripheral zone of a circular sedimentation tank. The relatively short filter plates then form a polygon approximating a circular shape. The cleaning device is then installed on the removal bridge.

In the case of larger filter units, the vertical cleaning direction is more advantageous, because a very large filter surface area can be installed on a small construction surface. In this case the operation of the filter cleaning device is based on the simple lift principle.

This filter arrangement is preferably intended as a replacement for a preliminary sedimentation tank. Deep, U-shaped gutters are formed from the filter plates and arranged over the hopper or funnel part. In this case, the filter material consists of very smooth plastic or steel gauze. The coarse sewage constituents slide under their own weight into the funnel and only the finer flakes are applied to the filter surface and are removed by the filter cleaning device.

The filter plates and the associated filter cleaning device can also be installed horizontally. The filter plates then replace the bottom of a shallow vessel. In this arrangement, the same components are used as in the vertical arrangement.

Due to the fact that the filter plates are automatically cleaned, it is possible to use fine-meshed filter materials and the filters do not have to be rendered inoperative for cleaning purposes.

Embodiments of the invention are described hereinafter relative to the drawings, wherein show:

FIG. 1 a filtering device with a vertically moved filter cleaning device in section.

FIG. 2 a filtering device with vertically moved filter cleaning device in side view.

FIG. 3 a filter plate with support grid distributed over spraying chambers and filter cleaning device.

FIG. 4 a filter plate with a spraying device provided with support grids and spraying chambers.

FIG. 5 a filtering device with horizontally moved filter cleaning device in section.

FIG. 6 a filtering device with horizontally moved filter cleaning device in plan view.

FIG. 7 a filtering device with horizontally fitted filter plates in section.

FIG. 8 a filtering device with horizontally fitted filter plates in plan view.

FIG. 1 shows a filter gutter with vertical filter cleaning in section and FIG. 2 the same thing viewed from the deposition side.

The filter materials 1 with a support grid 2 form a filter plate 3. The filter plates are preferably always installed for the same width and are arranged in the tank in such a way that they form a U-shaped filter gutter 4. In large plants, a plurality of gutters are juxtaposed. However, in small plants, the filtering device may only comprise a single filter plate.

Water flows through the filter plate from the filter material side, as a result of the overpressure caused by the level difference. On the deposition side of the filter plate, the suspended substances are deposited during filtration and clog the filter.

Filter cleaning takes place by means of a plurality of spraying 7 and sludge removal connections 8 fitted to the delivery 5 and suction pipes 6. These two connections are connected by flexible hoses 9 to the delivery and suction pipes in such a way that they can adapt to the unevennesses of filter plate 3. The length of the spraying and sludge removal connections is adapted to the width of the filter plates.

The spraying and sludge removal nozzles can also be directly fitted to the delivery 5 and suction pipes 6, without intermediate hoses 9. In this case, the cover plates 15 are movably joined to the delivery and suction pipes.

The delivery and suction pipes are connected by flexible hoses 10 to the not shown suction and delivery pumps. The pumps can also be mounted on the delivery and suction pipes.

In certain cases and mainly in small filtration plants, there is no need for a sludge removal pump. In this case, the sludge removal hose is passed into a lower-lying shaft underwater and sludge removal takes place by static overpressure.

The delivery and suction pipes are moved by a chain or cable 12 through a lift device 11.

FIG. 1 shows an appropriate construction of the drive. A filter cleaning device pair is fitted at each end of the chain 12 and are moved counter to one another. The weight of the cleaning device is compensated in this way and the driving force becomes smaller.

The filter cleaning process is represented in FIGS. 3 and 4. The cleaning fluid (e.g. already filtered sewage) is sprayed from spraying connections 7 through a series of spraying nozzles 13 into a spraying chamber 14. The spraying chamber is bounded (covered) by support grid 2 and cover plate 15. The sprayed-in cleaning fluid cannot escape sideways and must therefore pass through the filter materials 1. The washed-out, undissolved substances from the filter materials are removed from the other side by the sludge removal connection 8. A sludge removal plate 16 prevents water being sucked up from the tank.

Figure 1:
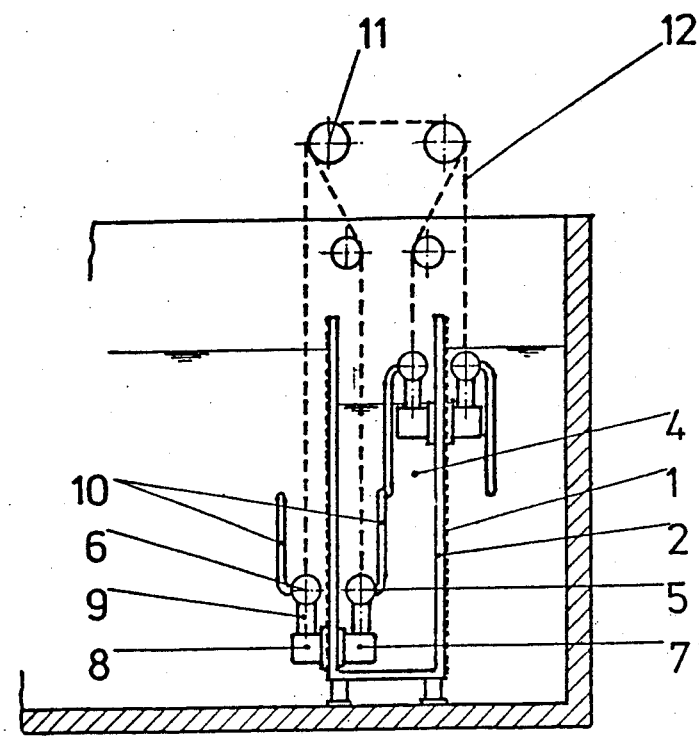
Figure 2:
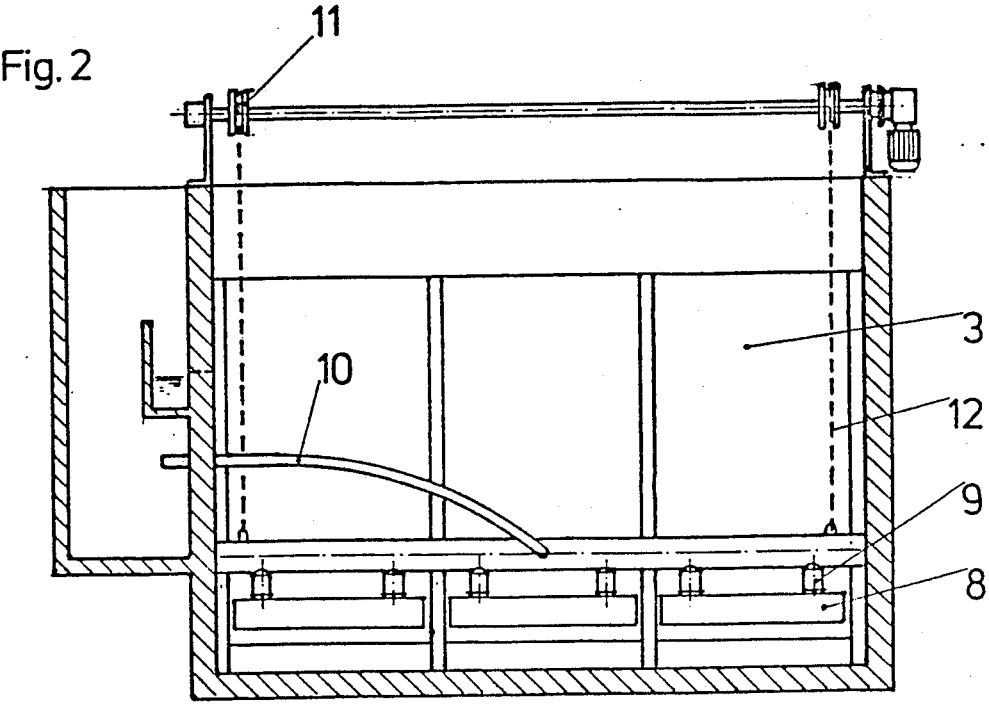
Figure 3:
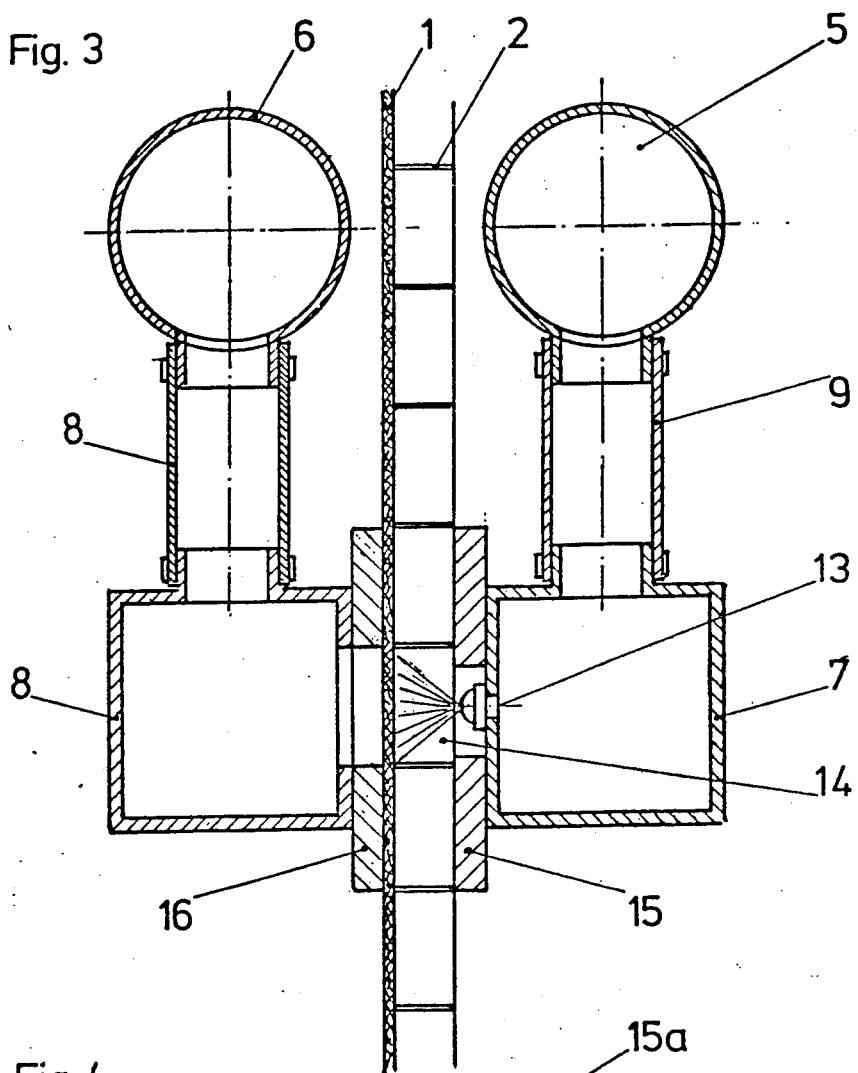
Figure 4:
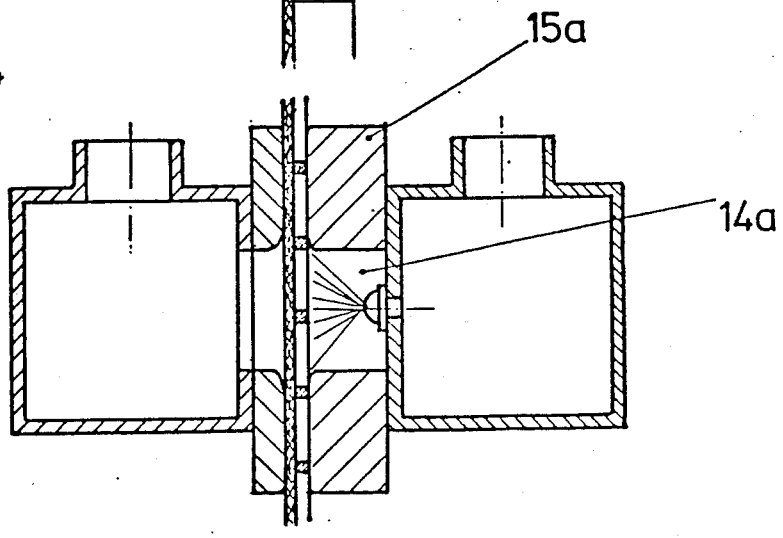
FIG. 4 shows a similar filter cleaning device, where the pressure chamber 14a is formed by pressure plate 15a and not by the support grid.
Figure 5:
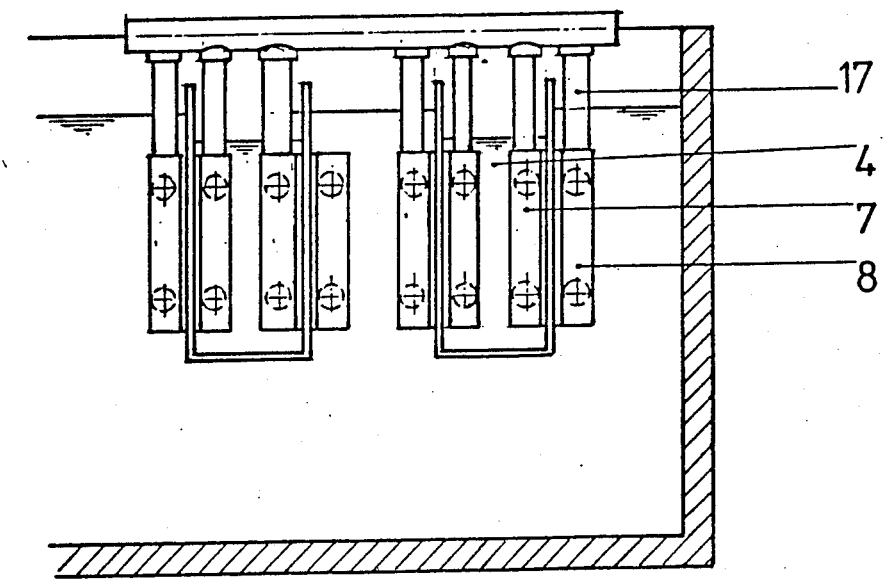
FIG. 5 shows a filter in section, with horizontally moved cleaning.
Figure 6:
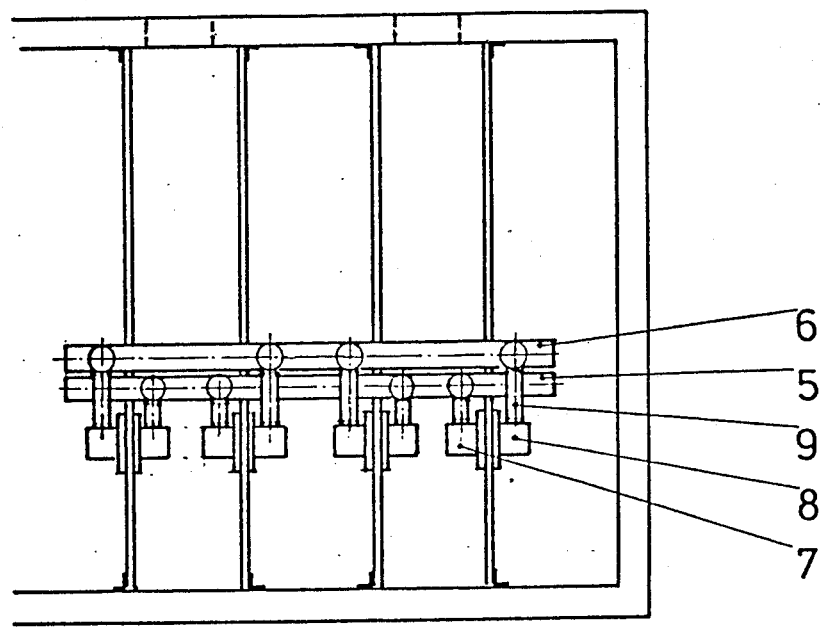

FIG. 6 is a plan view of the same filter, in which filter gutter 4 replaces a drain in an existing tank. In this case the filter cleaning connections 7 and 8 are connected to the flexible connecting hoses 9 and an intermediate tube 17 to the delivery 5 and suction pipes 6. The latter are mounted on a not shown removing trolley, on which are also fitted the filter cleaning pumps.

Figure 7:
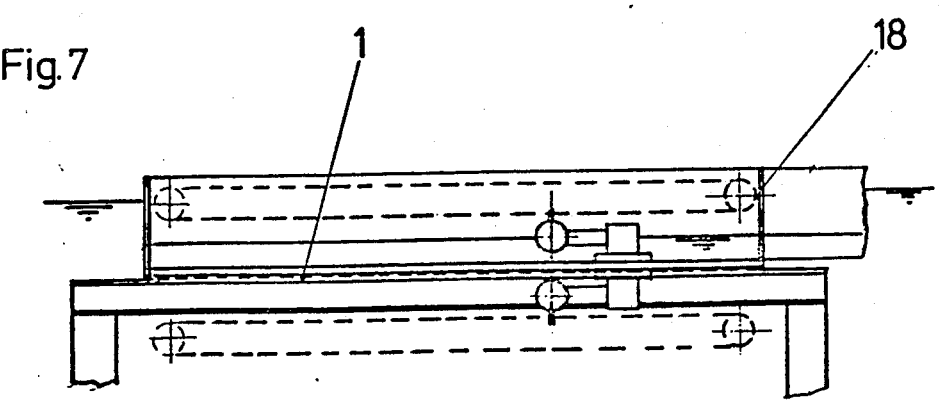
Figure 8:
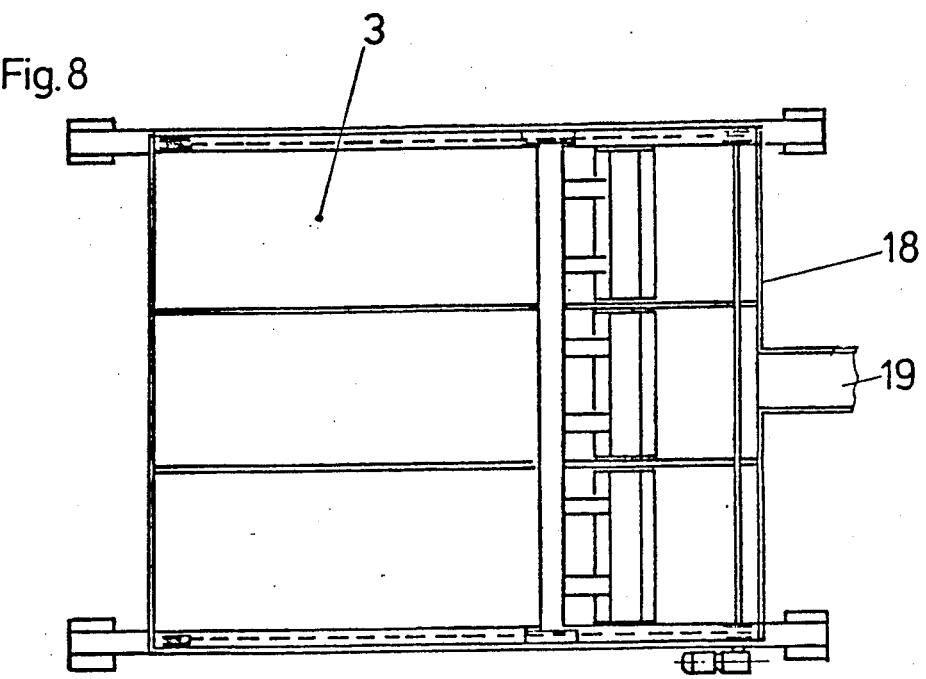

FIG. 7 shows in section a filtering device with horizontally mounted filter plates, whilst FIG. 8 is a plan view thereof. The filter plates 3 form the base of a vessel 18. Water flows from below through filter materials 1 into the interior of the vessel and is removed by means of a channel 19. Filter cleaning takes place in the same way as in the horizontal arrangement.

We claim:

1. A filter apparatus for separating a liquid slurry into a solids fraction and a liquid fraction, comprising:
a generally flat filter consisting essentially of a single support grid and a filter material located on one side of said support grid, said filter having an inflow side and an outflow side, said inflow side carrying said filter material and having solids deposited thereon and said outflow side being supported by said single grid, said grid subdividing said outflow side into a plurality of separate injection chambers and defining a plurality of separate small regions of said filter, said grid being only located on said outflow side;
jet means for directing a stream of liquid through one of said injection chambers and against one of said small regions of said filter defined by said one injection chamber, said jet means including a cover plate directly contacting and engaging said grid to close said one injection chamber opposite said filter material;

sludge removing means, directly contacting and engaging said inflow side of said filter and aligned with said jet means, for receiving solids dislodged from said filter by said stream of liquid; and moving means, coupled to said jet means and said sludge removing means, for simultaneously moving and maintaining alignment of said jet means and said sludge removing means to that said jet means and said sludge removing means close selectively each of said injection chambers to direct a stream of liquid therethrough.

2. A filter apparatus according to claim 1 wherein said moving means is adapted to move said jet means and said removing means linearly across said filter.

3. A filter apparatus according to claim 1 wherein said sludge removing means comprises a removal plate engaging said inflow side of said filter opposite said cover plate of said jet means.

4. A filter apparatus according to claim 1, wherein said jet means and said sludge removing means are moved along the filter apparatus in a vertical direction.

5. A filter apparatus according to claim 1 wherein said jet means and said sludge removing means are moved horizontally along the filter apparatus in a horizontal direction.

6. A filter apparatus according to claim 1 wherein said filter extends in the filter apparatus in a horizontal direction.

7. A filter apparatus according to claim 1 wherein said filter extends in the filter apparatus in a vertical direction.

8. A filter apparatus according to claim 1 wherein two filters are provided, said filters being cleaned by first and second sets of jet means and sludge removing means, respectivley, said moving means moving said sets in opposite directions to compensate for weight thereof.

* * * * *